(12) United States Patent
Toyama

(10) Patent No.: US 6,288,510 B1
(45) Date of Patent: Sep. 11, 2001

(54) DRIVE CONTROLLER FOR MOTOR-DRIVEN HIGH-SPEED ROTATING BODY AND METHOD FOR DISCRIMINATING TYPE OF MACHINE USED THEREFOR

(75) Inventor: Katsuhisa Toyama, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/254,845

(22) PCT Filed: Jul. 15, 1998

(86) PCT No.: PCT/JP98/03176

§ 371 Date: May 25, 2000

§ 102(e) Date: May 25, 2000

(87) PCT Pub. No.: WO99/04171

PCT Pub. Date: Jan. 28, 1999

(30) Foreign Application Priority Data

Jul. 16, 1997 (JP) .................................................. 9-191400

(51) Int. Cl.[7] ........................................................ G05B 5/00
(52) U.S. Cl. ........................ 318/461; 318/779; 318/801; 318/807; 318/808; 323/318; 323/344; 323/351; 417/356
(58) Field of Search ..................................... 318/461, 807, 318/808, 779, 801; 417/356; 323/318–344, 351

(56) References Cited

U.S. PATENT DOCUMENTS

| | | | |
|---|---|---|---|
| 4,734,634 | * | 3/1988 | Kito et al. ............................ 318/778 |
| 4,999,560 | * | 3/1991 | Morishima et al. ................. 318/779 |
| 5,637,970 | * | 6/1997 | Kisaka et al. ........................ 318/561 |
| 5,646,499 | * | 7/1997 | Doyama et al. ..................... 318/801 |
| 5,936,370 | * | 8/1999 | Fukao et al. ......................... 318/652 |
| 6,074,180 | * | 6/2000 | Khanwilkar et al. ................ 417/356 |

* cited by examiner

*Primary Examiner*—Paul Ip
*Assistant Examiner*—Rita Leykin
(74) *Attorney, Agent, or Firm*—Crowell & Moring, L.L.P.

(57) ABSTRACT

An objective of this invention is to provide a drive control device to control the drive applied to a high-speed rotor unit which would have no circuits in either its pump unit A or its power supply unit B that would limit the use of the device with various types of rotor units, which could easily be used with various types of rotor units, and whose power supply unit B could be used generally. The drive control device for controlling a high-speed rotor unit according to this invention has a power supply unit contains a set of tables of constants needed to control the various types of rotor units with which the drive control device might be used. These constants allow the rotation of the high-speed rotor unit to be adjusted or set according to the type of rotor unit. A signal intended to detect and indicate the type of rotor unit to be driven by the rotor is automatically detected and input before the motor is driven. Based on this signal, the appropriate table is selected.

8 Claims, 9 Drawing Sheets

DRIVE CONTROL DEVICE FOR CONTROLLING A MOTOR DRIVEN HIGH-SPEED ROTOR UNIT

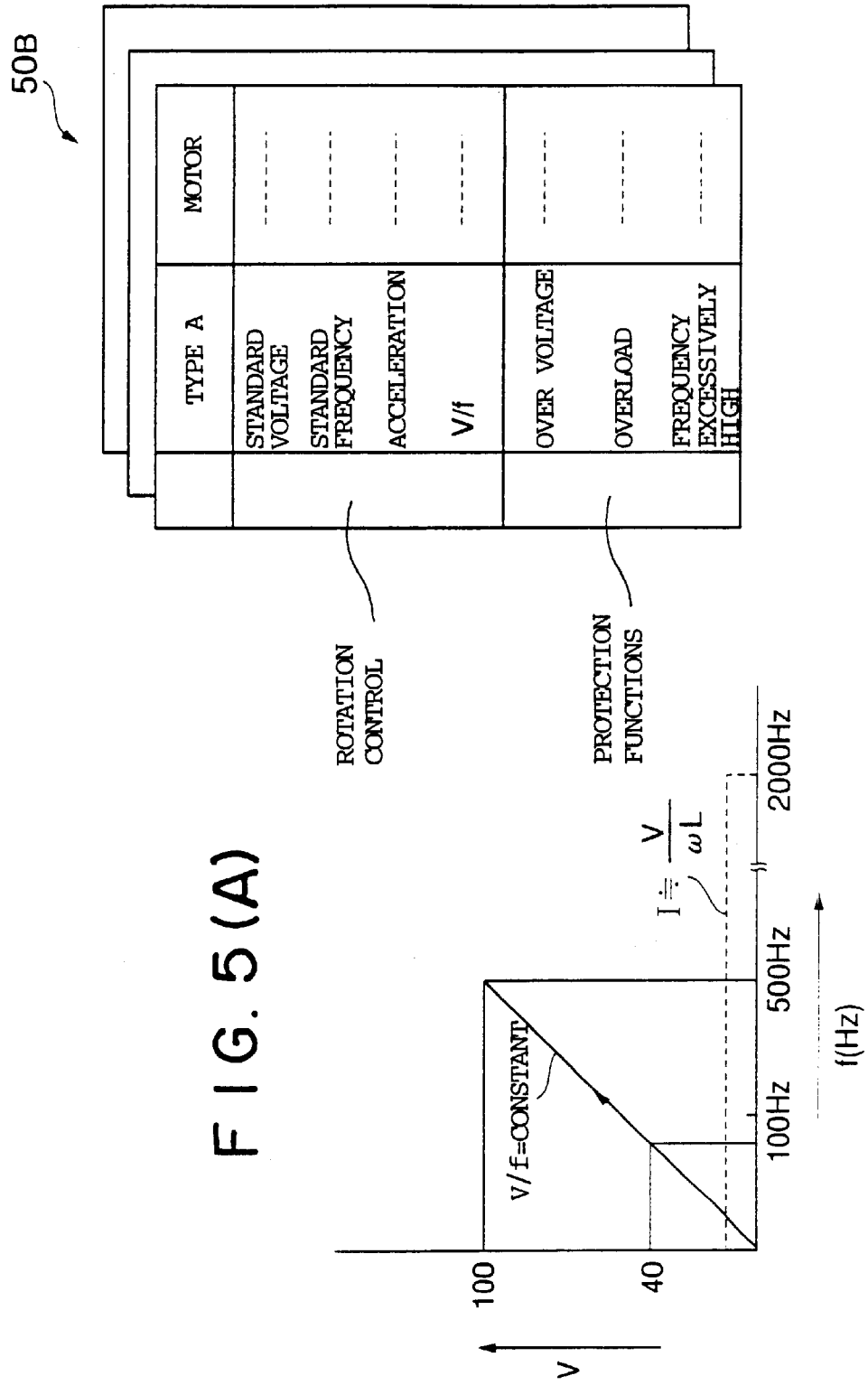

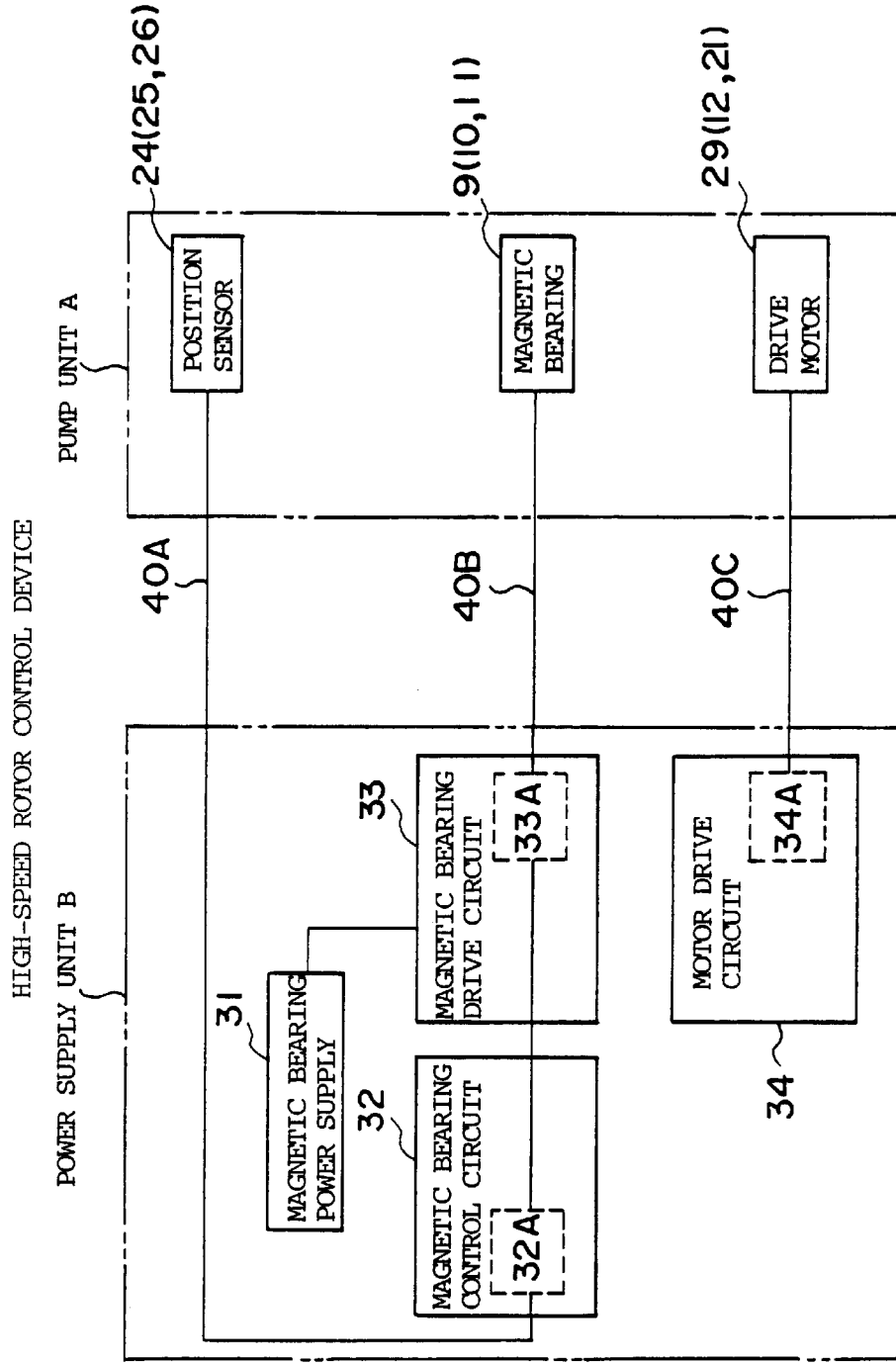

DRIVE CONTROLLER FOR MOTOR-DRIVEN HIGH-SPEED ROTATING BODY AND METHOD FOR DISCRIMINATING TYPE OF MACHINE USED THEREFOR

TECHNICAL FIELD

This invention concerns a drive control device for controlling a motor driven high-speed rotor unit and a discriminating method used in the drive control device to discriminate among different types of rotor units which are to be controlled. More specifically, it concerns a drive control device for controlling the drive applied to a high-speed rotor unit with magnetic bearings such as that in a turbo molecular pump, a compressor or turbine, or applied to the spindle in a rotor tool unit, and the discriminating method used in the drive control device to discriminate among these different types of rotor units.

TECHNICAL BACKGROUND

Magnetic bearings experience less loss than traditional hydrodynamically lubricated bearings. Being dry, they can be used in a clean atmosphere. They are also particularly practical for use in a vacuum state. For these reasons, magnetic bearings have come to be widely used to support the rotating parts of high-speed rotor units driven directly by motors, such as the rotors in turbo molecular pumps.

A high-speed rotor unit supported by magnetic bearings, such as a turbo molecular pump, would typically have the configuration shown in FIG. 9. Pump unit A and power supply unit B are electrically connected via cables 40. On side A are the pump itself; motor 29, which is directly connected to the pump; magnetic bearings 9, which maintain the position of the rotor of the motor 29 and the rotating portion of the pump connected directly to that rotor; and position sensors 24, which detect the gaps between the bearings and the rotor.

Power supply unit B comprises motor drive circuit 34 (a power supply circuit which possibly includes an inverter circuit) for driving motor 29, which is directly connected to the rotor; magnetic bearing control circuit 32 and magnetic bearing drive circuit 33, which receive the signals from the aforementioned position sensors 24 and control the drive voltages to magnetic bearings 9 (electromagnets) so as to keep the rotor centered; and magnetic bearing power supply 31, which supplies power to drive the magnetic bearings. Units A and B are connected by cables 40A through 40C.

Each of the control and drive circuits, 32 and 33, in power supply unit B configured as described above must be adjusted or set according to the type of pump unit used.

Magnetic bearing Control circuit 32 controls the magnetic bearings to keep the rotor centered in one embodiment of this invention which will be discussed shortly. This magnetic bearing control circuit comprises, as shown in FIG. 4 (A), a PID control circuit 62 equipped with a comparator element, an integrator element and a differentiator element; a phase compensator circuit 63, which stabilizes the vibrations with a plurality of dimensions resulting from the configuration of the rotor; filter circuit 61 (a notch filter, a low pass notch filter, a low pass filter or a phase filter); and a bias circuit 65, which applies bias current in order to assure that magnetic bearings 9 can rigidly bear the static load imposed by the rotor. Each of these circuits must be adjusted by setting different constants depending on the type of rotor unit being driven.

Also in motor drive circuit 34, if the inverter is to be operated such that V/f remains constant, not only the constants needed to control rotation by maintaining the rated voltage and frequency, but also various additional constants must be set to protect the rotor unit from overvoltage, overcurrent, overload and excessively high frequency inputs.

For this purpose, limit element circuit cards 32A to 34A are built into control circuit 32 and drive circuits 33 and 34 in power supply unit B for each type of rotor unit.

In prior devices, then, the pump unit A for a given type of rotor unit must be matched with a particular power supply unit B. The proper units A and B must be selected during assembly, and a power supply unit B and pump unit A selected for one type of rotor unit cannot be used for another type. Thus a different power supply unit must be selected for the pump unit used for each type of rotor unit. This severely compromises productivity. Such variation also poses a problem in terms of aftermarket administration and troubleshooting. If a number of different types of turbo molecular pumps are used, it becomes difficult to design the layout for the rotor units and the plant in which they are used. The installation will occupy a great deal of space, and maintenance will be troublesome.

To address these shortcomings, the present applicant proposed in Japanese patent application 8-317876 that the circuits in the power supply unit B be designed so as to limit the number of rotor unit types for which unit B would be applicable. According to the proposed design, which can be seen in FIG. 8. element circuit cards 32A through 34A for each type of rotor unit are provided in pump unit A for bearing control circuit 32 and bearing and motor drive circuits 33 and 34. Although this design allows power supply unit B to be used generally, it requires that each circuit such as bearing control circuit 32 and motor drive circuit 34, be built into the unit for each type of rotor unit, which limits the interchangeability of pump unit A,. This raises the production cost and increases the size of the hardware which constitutes pump unit A, which prevents the entire device from being streamlined. Another problem is that turbo molecular pumps are sometimes placed in the vicinity of equipment used in the production of semiconductors, particularly equipment where reactive substances are present such as vacuum containers (or chambers). The equipment or countermeasures required to maintain reliability when such circuit boards are installed in such a location are very costly.

DESCRIPTION OF THE INVENTION

An object of this invention is to provide a drive control device for controlling the drive applied to a high-speed rotor unit which would have no circuits in either its pump unit A or its power supply unit B that would limit the use of the device with various types of rotor units, which could easily be used with various types of rotor units, and whose power supply unit B could be used generally; and to provide a discriminating method for discriminating among different types of rotor units which could be used in the drive control device.

Another object of this invention is to provide a drive control device for controlling the drive applied to a high-speed rotor unit in a pump unit or the like which would not have any control boards in the pump unit, and to provide a discriminating method for discriminating among different types of rotor units which could be used in the drive control device. This would simplify the configuration of the unit, improve productivity, simplify aftermarket service, and enable a single type of power supply to be used with a number of different pump units. It will make it easier to design a device or a plant in which the pump unit is used. The device or plant will be smaller and easier to maintain.

In order to address the shortcomings outlined above, the present invention is designed as follows. The drive control device for controlling a high-speed rotor unit has a high-speed rotor unit and a power supply unit B. The high-speed rotor unit is equipped with magnetic bearings comprising electromagnets at the rotor or the stator. The rotor is supported in mid-air by the magnetic force of the bearings as it is made to rotate at high speed, and the specified load function is implemented. The power supply unit B is equipped with a magnetic bearing control means to control the electric power applied to the magnetic bearings according to signals from position sensors in the high-speed rotor unit, and a motor drive control means to control the drive power applied to the rotor and stator of a motor.

This drive control device is distinguished by the configuration that the power supply unit contains a set of tables of constants needed to control the various types of rotor units with which the drive control device might be used. These constants allow the rotation of the high-speed rotor unit to be adjusted or set according to the type of rotor unit. A signal intended to detect and indicate the type of rotor unit to be driven by the rotor is detected and input before the motor is driven automatically. Based on this signal, the appropriate table is selected.

The discriminating means to discriminate among various rotor units is realized by connecting the high-speed rotor unit to the power supply unit by DIP switches or parallel terminal blocks, so that the type of rotor unit can be indicated by operating the DIP switches or parallel terminal blocks, the connector needs only to be connected to the power supply unit by a cable to enable the user to easily identify and indicate, before the motor is driven, what type of rotor unit being used.

Let us assume that the drive motor is an inverter which controls the r.p.m while maintaining a constant voltage/frequency (V/f) value. If voltage of a waveform which minimizes the ratio (V/f) is applied to the motor, the winding specifications of the motor, which will differ with the type of rotor unit being driven, can be detected. So if we detect a signal representing drive current while the rotor is at rest, we can easily determine from the signal what type of rotor unit is being driven by the rotor connected to the motor.

To explain this relationship in more concrete terms, the current value I, which is the current supplied to an AC motor by an inverter, can be expressed as the following formula using voltage V, frequency F ($=\omega/2\pi$), resistance R and inductance L:

$$I = V/(R + j\omega L) \quad (1)$$

where $\omega$ ($=2\pi F$) is the angular velocity (which is proportional to frequency F).

As is made clear by formula (1), the value I of the current which flows to the AC motor is determined by the characteristics of the motor, namely its winding specifications and the resistance of its cable (resistance value R and winding inductance L), according also to the voltage V applied to the motor and its frequency F.

As formula (1) also makes clear, differences between current values I which are due to different winding specifications of AC motors will be greater the higher the frequency F generated by Inverter 1.

In other words, because the relationship between resistance value R and winding inductance L is such that R>L, unless if a high frequency is used, the dependence of current I on frequency will not become apparent.

The load relative to the AC motor on the pump which is directly connected to that motor (the gas load, the rotational inertia of the rotor, etc.) will vary according to the type of rotor unit being driven. Since the required capacities of AC motors vary as above, naturally their winding specifications must also vary.

The current value I flowing to the AC motor in response to a voltage V and a frequency F can be measured to determine what type of turbo molecular pump is being driven. If all the current values I which result from different winding specifications are paired with the types of rotor units the pump unit can drive and are stored in a data table, then the table can be selected for the appropriate type of pump by the measured current value I as a discriminating signal, thus allowing the power supply unit to be adapted readily.

With this invention, one of the sets of constants stored in the table is selected according to the discriminating signal representing the type of rotor unit to be driven. This set of constants is loaded into either the magnetic bearing control means to control the magnetic bearings or the motor drive control means to control the drive produced by the motor or both. In this way these control means can be converted to the right control means equipped with the appropriate constants by the settings according to what type of rotor unit, or what type of turbo molecular pump, is to be driven. This is one of the distinguishing features of the present invention.

In this drive control device for the high-speed rotor unit which loads the constants for the magnetic bearing control means and the motor drive control means, the set of constants for each type of rotor unit can be retrieved by searching them in the table according to the discriminating signal so as to prepare the appropriate control means before it begins the control operation.

The control means for controlling the magnetic bearings and the motor drive need not be realized by hardware such as an independent analog or digital circuit, but may instead be realized by software.

This invention may also be used for a discriminating method to discriminate among various types of rotor units with high-speed rotor units. The high-speed rotor unit is equipped with magnetic bearings comprising electromagnets at the rotor or the stator. The rotor is supported in mid-air by the magnetic force of the bearings as it is made to rotate at high speed, and the specified load function is implemented. The winding specifications of the motor equipped with the rotor and stator will vary depending of the type of rotor unit the rotor is a part of. In the discriminating method for determining the type of rotor unit, the type of rotor unit being driven by the rotor is determined from a signal representing the drive current of the motor which is detected while the rotor is still at rest. This method is a distinguishing feature of the present invention.

If the drive motor is an inverter which controls r.p.m by maintaining a constant voltage/frequency (V/f) value, a voltage of a waveform which minimized the ratio (V/f) and maximized the frequency is applied to the motor for the purpose of determining what type of rotor unit is being driven by the rotor from the signal representing drive current. This method is a distinguishing feature of the present invention.

A BRIEF EXPLANATION OF THE DRAWINGS

FIG. 5 (A) is a graph of voltage with respect to frequency which shows the distribution of V/f for the drive generated for the motor in this embodiment and the current signal used to determine what type of rotor unit is being used. (B) shows the tables used in the same embodiment.

FIG. 9 is a block diagram showing the relationship between a pump unit with magnetic bearings and the power supply unit which controls the drive to the pump unit in another device belonging to the prior art.

PREFERRED EMBODIMENTS

In this section we shall give a detailed explanation of the invention with reference to the drawings, using preferred embodiments for the purpose of illustration. To the extent that the dimensions, materials, shape and relative position of the components described in these embodiments need not be definitely fixed, the scope of the invention is not limited to the embodiments as described herein, which are meant to serve merely as examples.

Figure 7A:
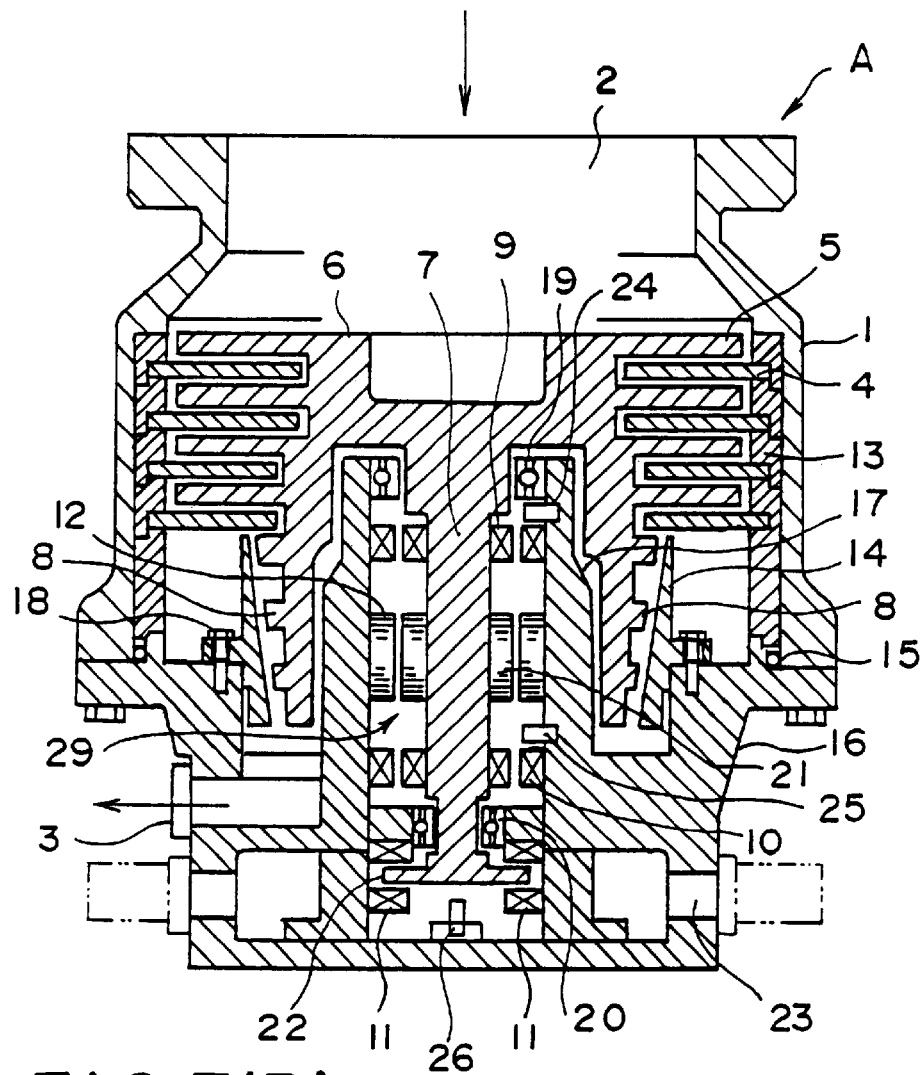
FIG. 7 (A) is a vertical cross section of a turbo molecular pump in which the present invention is applied. (B) is a rough horizontal cross section which shows the placement of the magnetic bearings and the position sensors.
Figure 7B:
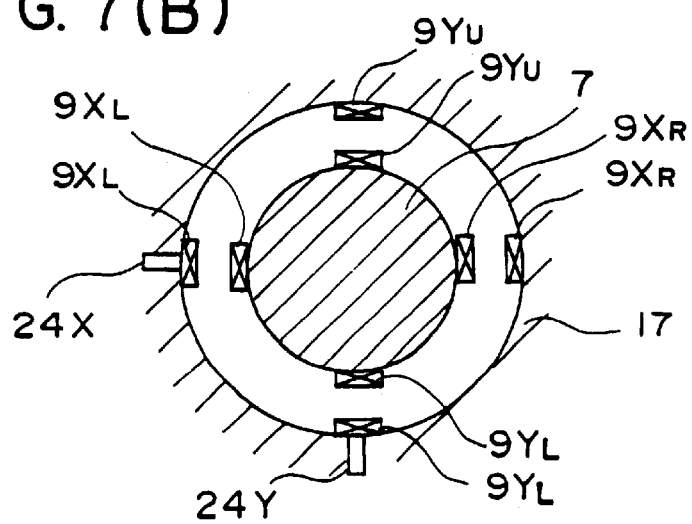
Figure 8:
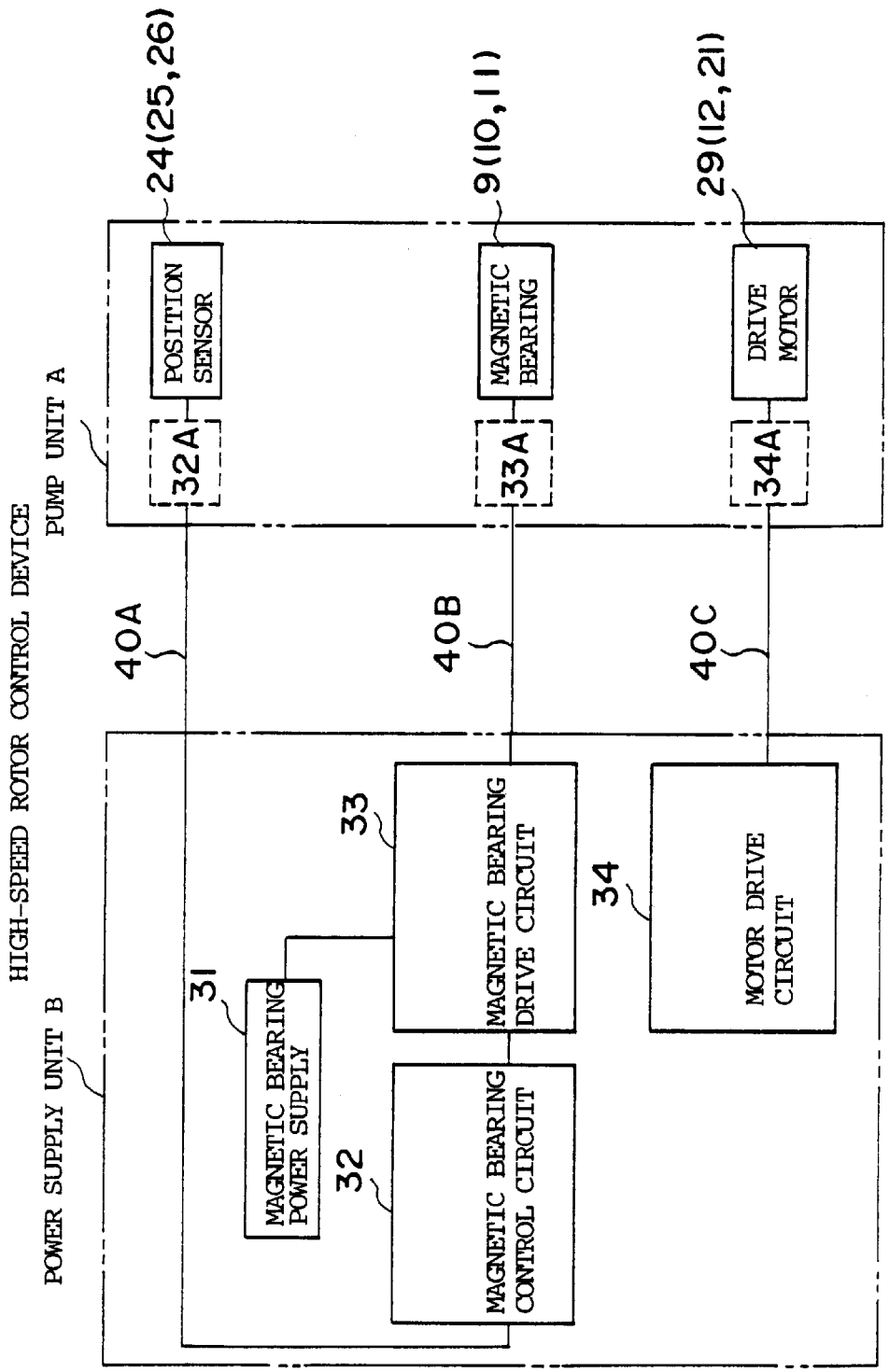
FIG. 8 is a block diagram showing the relationship between a pump unit with magnetic bearings and the power supply unit which controls the drive to the pump unit in a device belonging to the prior art.

We shall begin with an explanation of the turbo molecular pump employed in this invention, with reference to FIG. 7. In FIG. 7 (A), 1 and 16 are the upper and lower casings, which are assembled into a single entity through the mediation of O-ring 15 and a number of bolts. The opening on top of upper casing 1 serves as gas intake port 2. An array of annular static blades (fixed blades) 4 is arranged vertically along the interior surface of the casing 1 and separated from each other by spacers 13.

Below static blade array (fixed blades) 4. sealing ring 14 faces and surrounds the outer periphery of pump stages 8, a series of screw grooves which will be discussed shortly, across a microscopic gap. This improves the ability of the pump to develop a pressure differential.

Lower casing 16 has an exhaust port 3 on its side. Below this port connector 23 is inserted into the pump.

Support cylinder 17 rises vertically from the center of the upper surface of lower casing 16. On the inner periphery of the support cylinder 17, facing rotor shaft 7, are, starting from the top of the support cylinder, upper guard bearing 19; upper magnetic bearing 9; motor stator 12; lower magnetic bearing 10; lower guard bearing 20; and magnetic thrust bearing 11.

6 is the rotating body of the pump, which has a rotor shaft 7 extending downward from its upper surface. A vertical array of dynamic blades (rotary blades) 5 radiates from the upper portion of the rotating body 6 so as to be interpolated between the static blades 4. Screw pump protrusions 8, which resemble a screw thread, are disposed on the outer periphery of the lower portion of the rotating body 6.

Rotor shaft 7, which is inserted into the support cylinder 17, engages motor rotor 21 in a location which faces the motor stator 12 to constitute AC motor 29. The upper magnetic bearing 9 is provided at the upper portion of the rotor shaft, and upper guard bearing 19 is provided above the upper magnetic bearing 9 in order to make proper gaps.

The lower magnetic bearing 10 is also provided at the lower portion of the rotor shaft, and lower guard bearing 20 is provided below the lower magnetic bearing in order to make proper gaps. There is a round magnetic plate 22 on the lower extremity of the rotor shaft 7. The plate 22 is inserted into magnetic thrust bearing 11, which is attached to the sides of support cylinder 17. This magnetic plate controls the supporting shaft in mid-air in the direction of thrust (along the Z-axis).

In other words, the upper and lower magnetic bearings 9 and 10 are arranged in pairs on the left and right (the X-axis) and front and rear (the Y axis) sides of the shaft, as can be seen in FIG. 7 (B), which is a cross section of the shaft taken orthogonally to its axis. In this way the rotor shaft 7 is supported in mid-air along its axis in such a way that there is no possibility of its falling. The magnetic thrust bearing 11 (on the Z-axis) and upper and lower magnetic bearings 9 and 10 (on the X and Y-axes) maintain the rotor shaft 7 in mid-air in five axial directions as it rotates.

Should there be an abnormality in the magnetic control exercised by any of the bearings 9, 10 or 11 such that the position of rotor shaft 7 becomes eccentric and leans to one side or another, it will come in contact with upper or lower guard bearings 19 or 20 and its rotation will be compensated.

When voltage is applied to each of the magnetic bearings 9, rotating body 6 will be supported in mid-air by its rotor shaft 7. When, in this state, the motor of the turbo molecular pump configured as described above is made to rotate at a speed of 10,000 to 100,000 rpm, dynamic blades 5 will rotate between static blades 4, and screw pump protrusions 8 will rotate facing sealing ring 14. As gases to be vacuum-exhausted are introduced through overhead intake port 2, the gases are pressurized in a first pressure stage in the space between dynamic blades 5 and static blades 4. The pressured gases are further pressurized in the thread channel formed by the screw pump protrusions 8 as a second pressure stage, and conducted toward exhaust port 3.

In this embodiment, each of magnetic bearings 9, 10 and 11 has a position sensor 24, 25 or 26 near them. These sensors detect the gap (on the X and Y-axes) between rotor shaft 7 and support cylinder 17 at the locations of bearings 9, 10 and 11 as well as the displacement in the thrust direction.

Figure 1:
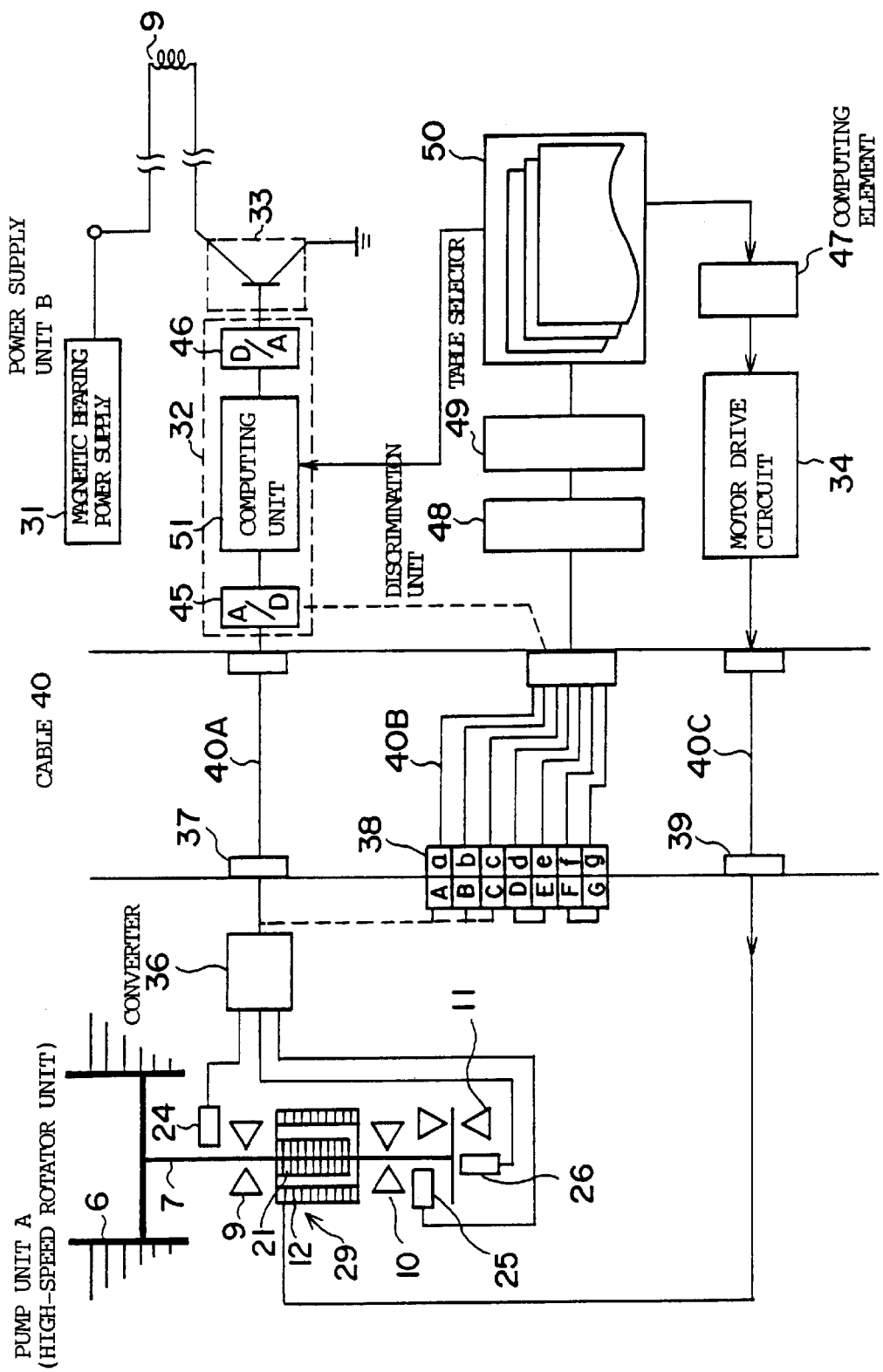
FIG. 1 shows the principal components of the pump and power supply units of a first preferred embodiment of this invention. In this block diagram, the power supplied to drive the magnetic bearings is controlled digitally.

FIG. 1 shows the principal parts of the first preferred embodiment of this invention, namely, a pump unit A employing the turbo molecular pump which is one example of the high-speed rotor units, and a power supply unit B. As can be seen in the drawing, pump unit A and power supply unit B are electrically connected via cables 40. As discussed above, pump unit A comprises motor 29, consisting of motor rotor 21, which is directly connected to rotor shaft 7 of rotating body 6 of the pump, and stator 12; upper and lower magnetic bearings 9 and 10, which are placed above and below the motor rotor 21; magnetic thrust bearing 11, which surrounds the round plate at the lower extremity of the rotor shaft 7; and position sensors 24, 25 and 26, which detect the gap between the upper and lower magnetic bearings 9 and 10 and rotor shaft 7 (on the X and Y-axes) as well as the displacement in the thrust direction between magnetic thrust bearing 11 and the round plate.

In this embodiment, the signals from the position sensors 24, 25 and 26 are transmitted by way of converter 36 and connector 37 through signal cable 40A to power supply unit B.

Here DIP switch-type connector 38 is employed as the means to determine what type of rotor unit is being driven.

The DIP switch-type connector 38 may be an independent entity which is separate from the connector 37 for signal transmission, or some of the terminals on connector 38 may be used as the signal connector for signal transmission.

For example, in this embodiment terminals A through C might be used for signal transmission, while terminals D through G would function similarly to DIP switches.

To use terminals D, E, F and G as DIP switches, we would switch each terminal on or off. The four-place digital I/O signals (0000 to 1111) set for the various types of rotor units would be transmitted via parallel signal cables 40B to discrimination unit 48 in power supply unit B, which would distinguish what type of rotor unit is being used according to which digital I/O signal (0000 to 1111) it received.

For example, we might establish a set of digital I/O signals such that (0001) indicated rotor unit type A, (0010) rotor unit type B, (0011) rotor unit type C and (0100) rotor unit type D. This would allow power supply unit B to distinguish easily among the various types of rotor units.

Terminals D through G could also be used as ordinary terminals rather than DIP switches. In this case particular terminals among the four would be bridged in a given pattern according to the type of rotor unit. The signals indicating the connections would be transmitted via parallel signal cables 40B to discrimination unit 48 in power supply unit B, which would distinguish what type of rotor unit was being used according to the pattern of short circuits it received.

For example, a short between terminals D and E only might indicate rotor unit type A, one between terminals E and F only might indicate rotor unit type B, one between terminals F and G only might indicate rotor unit type C, and shorts between terminals D and E as well as F and G might indicate rotor unit type D. In this way power supply unit B could distinguish easily among the various types of rotor units.

Power supply unit B comprises motor drive circuit 34 (for example, an inverter circuit), which drives the motor 29 at a high speed; computing unit 51 in magnetic bearing control circuit 32 which receives signals from the position sensors 24, 25 and 26, controls the drive voltage applied to magnetic bearings (i.e., electromagnets) 9, 10 and 11, and keeps rotor shaft 7 centered; magnetic bearing drive circuit 33, which receives a signal from the computing unit 51 and switches on and off the drive voltage supplied from magnetic bearing power supply 31 by a transistor circuit.

Figure 4B:
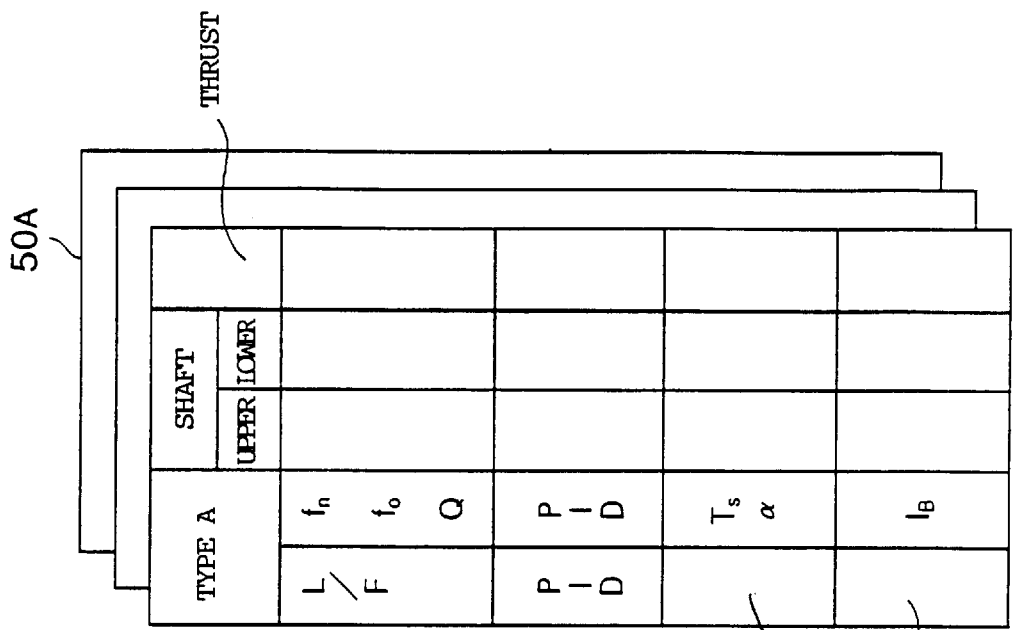
FIG. 4 (A) is a block diagram of the control circuit for the magnetic bearing which is used in the embodiment in FIG. 3. (B) shows the tables used in the same embodiment.
Figure 4A:
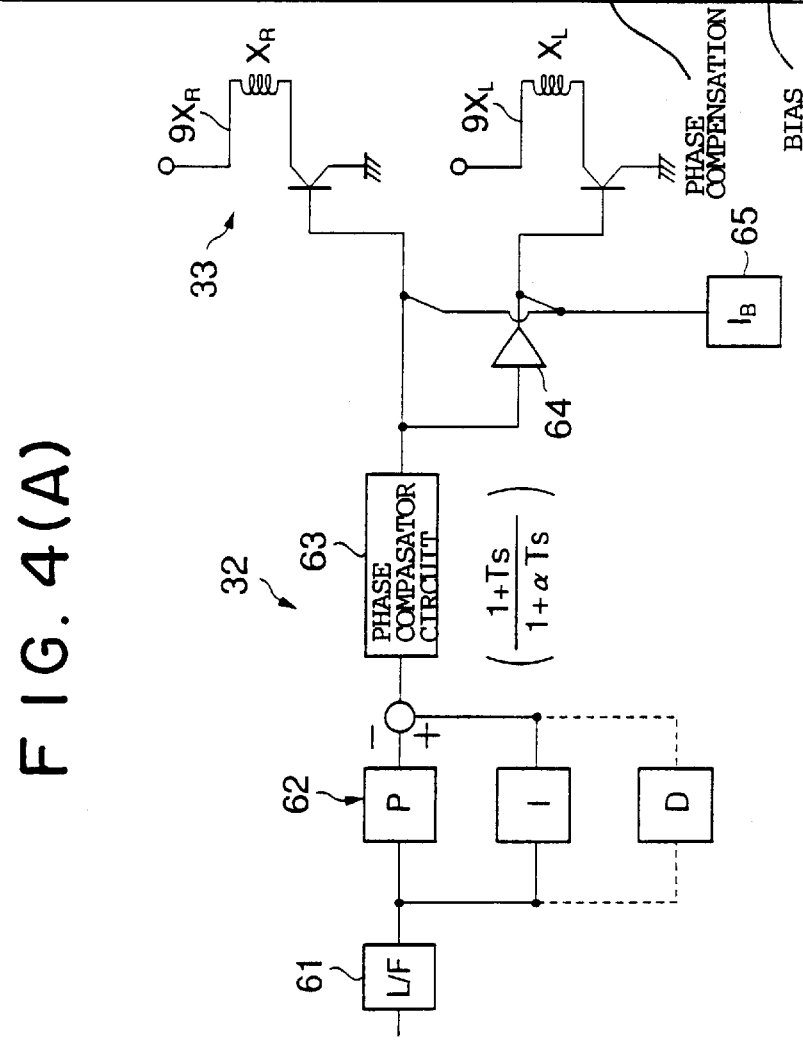

As can be seen in FIG. 4, the number of computing units 51, which serve as the magnetic bearing control circuit 32, and drive circuits 33 which are provided corresponds to the number of pairs n of electromagnets which constitute magnetic bearings 9.

In other words, if as in FIG. 7 (B) upper and lower magnetic bearings 9 and 10 each have one pair of magnets in the direction of the X-axis and one in the direction of the Y-axis (making a total of four pairs), and magnetic thrust bearing 11 has one pair in the vertical direction, the bearing contains a total of five pairs of magnets. Then pump unit A will require five sets of position sensors 24, 25 and 26, five of the computing units 51, which perform calculations and control the voltage based on the signals representing the position of the shaft, and five magnetic bearing drive circuits 33 to drive the magnetic bearings.

Since the data concerning constants to be used which are retrieved from table 50 (to be discussed shortly) are in the form of digital signals, the magnetic bearing control circuit 32 Is realized as a computing unit 51 such as a CPU, which can output control values based on digital calculations. However, because the signals transmitted by position sensors 24, 25 and 26 and the control signals sent to magnetic bearing drive circuit 33 are analog signals, an A/D converter 45 is provided on the input side of computing unit 51 to digitize the signals from the position sensors, and a D/A converter 46 is provided on its output side. This D/A converter changes the computational output of unit 51 to an analog signal which can be used to control the voltage to the magnets and outputs the analog signal to magnetic bearing drive circuit 33.

Computing element 47, which has the function of a D/A converter, is placed on the input side of motor drive circuit 34. It converts the constants retrieved from table 50 (to be discussed shortly) to analog signals and transmits them to motor drive circuit 34.

Table 50, which is an essential feature of the present invention, contains as many magnetic bearing control tables 50A, the tables of constants needed to control the magnetic bearings, and motor drive tables 50B, the tables of constants needed to control the motor drive, as there are types of rotor units. Based on a signal from discrimination unit 48, table selector 49 selects the correct table 50 for the rotor unit being used. The signal from table 50A to control the bearings is sent through computing unit 51; the signal from table 51B to drive the motor is sent through computation element 47 to motor drive circuit 34.

Computing unit 51, computing element 47, discrimination unit 48, table selector 49 and table 50 can use a single computing unit, or a number of discrete computation units may be used.

We shall next discuss magnetic bearing control table 50A, the table of constants needed to control the magnetic bearings, and motor drive table 50B, the table of constants needed to drive the motor.

FIG. 4 (A) shows a rough sketch of magnetic bearing control circuit 32, a circuit which might be used to control the magnetic bearings. This circuit is in the public domain, having been published in Japanese Utility Patent No. 2522168. We shall explain the necessary constants as we discuss the control circuit.

First, the signals from position sensors 24, 25 and 26 are passed with appropriate gain through an error amplifier or the like so as to provide position feedback (not pictured) and then through low-pass notch filter 61. Filter 61 filters out random noise in the mid-high frequency band across a wide range.

The feedback signal which has passed through the low-pass notch filter 61 is then fed through PID control circuit 62, which consists of a proportional element, an integral element and a differential element. The signal next passes through phase compensator circuit 63, which stabilizes the response with respect to the various characteristic frequencies of the normal modes of vibration resulting from the configuration of the rotating body 6. When the control current needed for feedback is obtained, a bias current is added to the control current to ensure the static rigidity of magnetic bearing 9. The superposed bias current is applied to the base of the transistor which comprises magnetic bearing drive circuit 33, and the drive power which drives the right magnetic bearing $9XR$ is controlled. The superposed bias current is inverted by operational amplifier 64, the inverted current is applied to the base of the transistor, and the drive power which drives the left magnetic bearing $9X_L$ is controlled.

As disclosed in Japanese Utility Patent No. 2522168, each of the main control elements pictured in FIG. 4 (A) has its own computation method. A different constant set is used for a given element depending on the type of rotor unit being driven.

In low-pass notch filter 61, the constants set for each type of rotor unit are the notch frequency $f_n$, the resonant frequency $f_Q$ and the magnification factor Q of the resonance. In PID control circuit 62, the constants are the proportional constant P, the integral constant I and the differential constant D. In phase compensator circuit 63 they are constant $T_s$, α (the time constant) and the bypass current IB.

These constant sets are tabulated for each type of rotor unit in tables 50A (see FIG. 4 (B)), the tables of constant sets needed to control the magnetic bearings.

As is shown in FIG. 4 (A), the constants may be tabulated as a formula which allows digitalization. In this embodiment they are tabulated and built into computing unit 51.

We shall next discuss table 50B, the table of constant sets needed to control the motor drive, with reference to FIG. 5.

As can be seen in FIG. 5 (A), the motor 29 of this embodiment is controlled by inverter control such that V/f is constant. When increasing or decreasing the rpm of the motor 29, then, the voltage V and frequency f must remain in a fixed ratio.

If motor drive circuit 34 is inverter controlled under the condition that V/f is constant, not only the constants related to the rated voltage and the rated frequency, but also other constants which must be tabulated for each type of rotor unit, such as overvoltage, overcurrent, overload or excessive frequency can be tabulated for each type of rotor unit. These constants, which have been tabulated for each type of rotor unit, are stored in Table 50B, shown in FIG. 5 (B).

Figure 2:
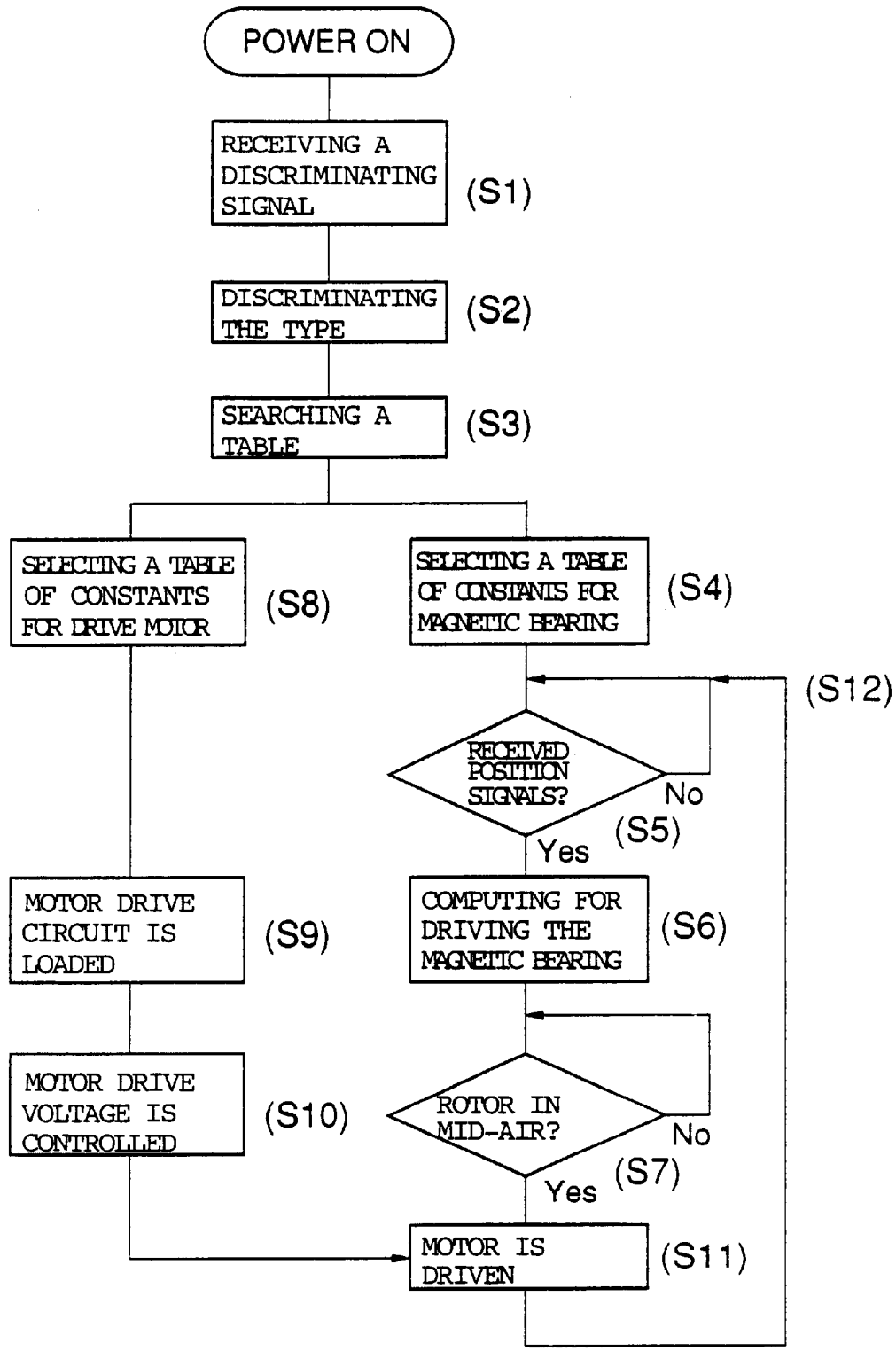
FIG. 2 is a flow chart of the order of operations performed by the embodiment in FIG. 1.

Next we shall explain the order of operations performed by this embodiment, with reference to FIG. 2.

When the start switch of power supply unit B is switched on, discrimination unit 48 receives a signal consisting of digital I/O or a pattern of short circuits from DIP switch-type connector 38 which identifies the type of rotor unit (Step 1), and the type of rotor unit is recognized (Step 2).

Based on the received signal, table selector 49 searches the appropriate Table 50B of constant sets needed to control the motor drive and the Table 50A of constant sets needed to control the magnetic bearings (Step 3).

After it selects the appropriate Table 50A (Step 4), computing unit 51 in magnetic bearing control circuit 32, accepts the signals from the position sensors (Step 5). It performs the calculations for the type of rotor unit which is being controlled and generates an output signal to control the magnetic bearings (Step 6). Based on that output signal, it drives magnetic bearing 9 and causes rotor shaft 7 to be supported in mid-air (Step 7).

Based on the constant sets selected from table 50B, motor drive circuit 34 is loaded (Steps 8 and 9), the motor drive voltage is controlled (Step 10), motor 29 is driven, and its revolution rate is controlled (Step 11).

Thereafter, the magnetic bearing control process is repeated based on the constant sets specified in table 50A as signals are received from the position sensors (Step 12).

Figure 3:
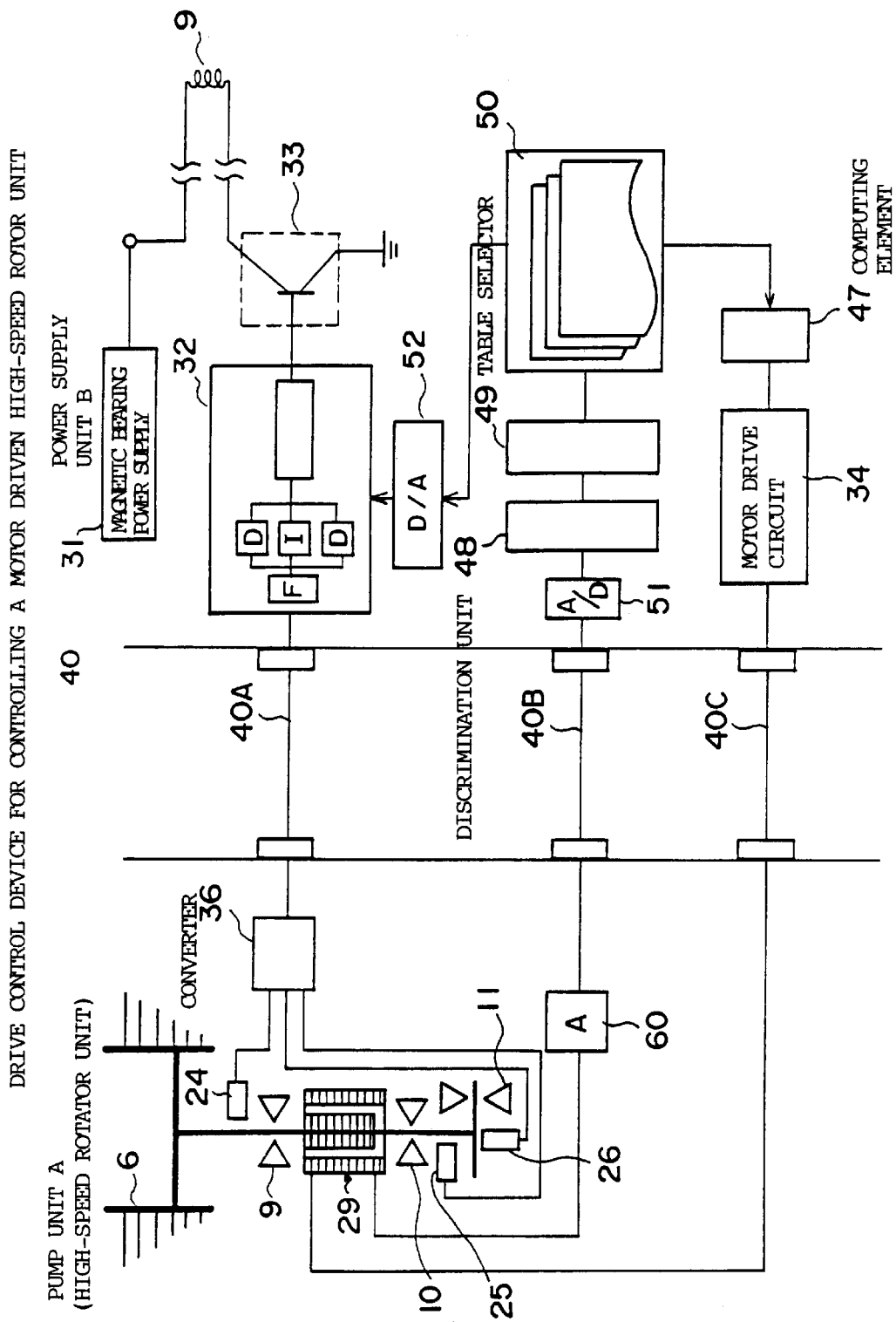
FIG. 3 shows the principal components of the pump and power supply units of a second preferred embodiment of this invention. In this block diagram, the power supplied to drive the magnetic bearing is controlled by an analog circuit.

In FIG. 3, another drive control device is shown which uses an analog control circuit instead of the computing unit 51. This analog control circuit generates an analog signal to control the bearing. Ammeter 60 in pump unit A provides the discriminating signal to indicate what type of rotor unit is connected to the motor. The type of rotor unit is determined based on the signal obtained from the ammeter 60.

Since the constants stored in table 50 are digital signals, they are changed to analog signals by D/A converter 52 before being transmitted to magnetic bearing control circuit 32. And since the signal representing the current which is detected is analog, it must go through A/D converter 53 before being sent to discrimination unit 48, where it is compared with values stored in a table to determine what type of rotor unit is being driven.

Because the current must be detected in the control operation before motor 29 revolves, a means for this purpose must be provided.

The motor 29 of this embodiment is controlled by inverter control such that V/f is constant. Accordingly, when increasing or decreasing the rpm of the motor 29, voltage V and frequency f are controlled to have a fixed ratio. However, as the dotted line in FIG. 5 (A) will show, it is desirable that the current be detected by keeping voltage V low and frequency f high and applying a voltage such that motor 29 does not revolve.

The magnetic bearing control and the motor drive control in this embodiment can be operated using the same order of operations as in FIG. 2.

Figure 6:
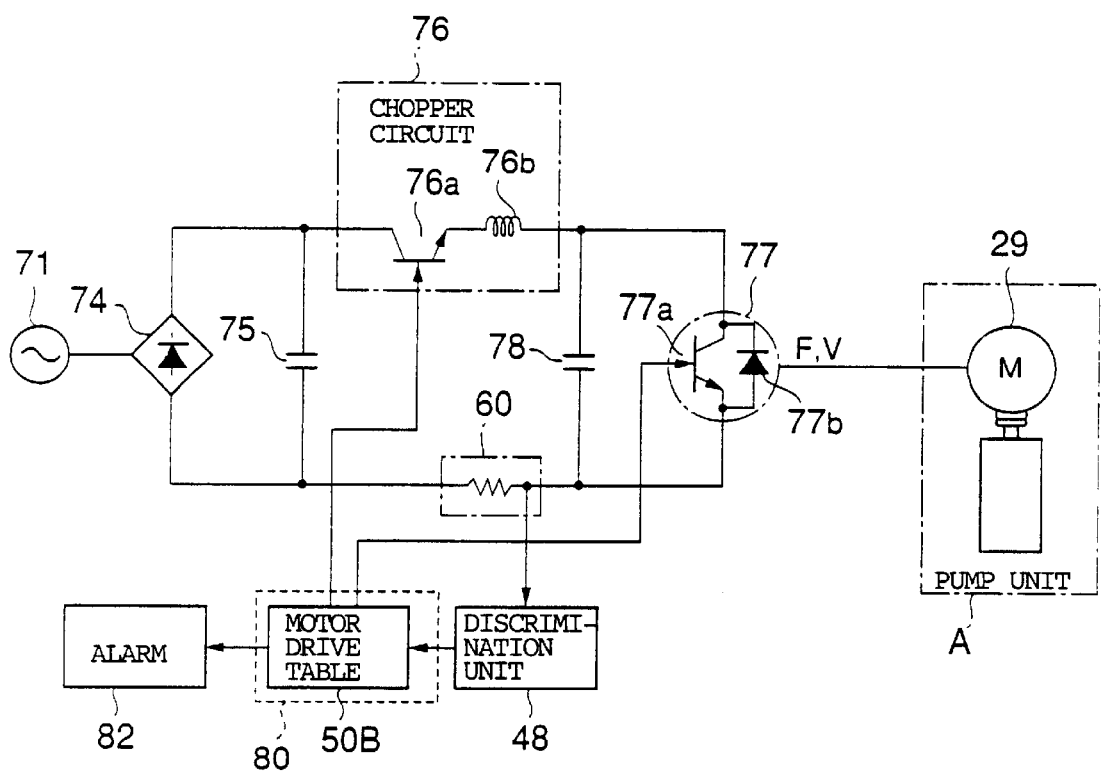
FIG. 6 is a block diagram of the circuit to determine what type of rotor unit is being driven and the circuit to control the drive generated by the motor in another preferred embodiment of this invention.

We shall now discuss, with reference to FIG. 6, another preferred embodiment of this invention in which the drive produced by the motor is controlled based on the signal representing the type of rotor unit connected to the motor.

FIG. 6 shows a discrimination circuit for discriminating a type of rotor unit among different types of rotor units and a motor drive circuit for controlling the drive applied to the motor according to another preferred embodiment of this invention. 71 and 29 are the inverter in power supply unit B and the motor of pump unit A. Here the inverter uses a PAM (pulse amplitude modulation) scheme.

In FIG. 6, 74 is a rectifier connected to input power supply 71; 75 is a capacitor connected between the terminals of rectifier 74; 76a is a transistor whose collector is connected to one of the terminals of capacitor 75; 76b is a choke coil connected to the emitter of transistor 76a; 76 is a chopper circuit comprising transistor 76a and choke coil 76b.

77a is a transistor whose collector is connected to the output terminal of chopper circuit 76; 77b is a diode connected in parallel with reversed polarity between the collector and emitter of transistor 77a; 77 is an inverter bridge circuit comprising transistor 77a and diode 77b; and 78 is a capacitor connected between the terminals of inverter bridge circuit 77.

Chopper circuit 76 controls the output voltage V applied to AC motor 29. Inverter bridge circuit 77 controls the frequency F of the output voltage V applied to AC motor 29.

With inverter 71, the circuit elements on the primary side of the power supply (rectifier 74 to capacitor 78) comprise the power supply for the motor.

60 is the current detection circuit (ammeter) which detects the value of the current I which is flowing to AC motor 29.

It consists of a resistor inserted between one of the terminals of inverter bridge circuit 77 and one of the terminals of rectifier circuit 74.

As the dotted line in FIG. 5 (A) suggests, the current is detected by keeping the voltage V low and the frequency f high and applying a voltage such that motor 29 does not revolve, then detecting the current while the motor is at rest.

48 is the discrimination unit which discriminates in analog fashion what type of rotor unit is connected to AC motor 29 based on the current value I. It might, for example, comprise a comparator and a circuit which sets a predetermined current for each type of rotor unit. The comparator could compare the current detected by current detect circuit 60 with the reference current for every type of rotor unit. It would then determine what type of rotor unit is being run based on the output of the comparison.

50B is a control table in control circuit 80, a microprocessor. The circuit outputs a control signal according to the signal from discrimination unit 48 indicating the type of rotor unit it has determined is connected to the motor. Chopper circuit 76 and inverter bridge circuit 77 are switched automatically by the control signal depending on what type of rotor unit it is.

82 is an alarm connected to control circuit 80. If the type of rotor unit indicated by the signal is different from whatever type was previously specified, the circuit generates a signal indicating an abnormality to inform the user that the wrong rotor unit has been connected.

The current detecting mode used to detect current value I in order to determine what type of rotor unit is connected to the motor should be set during a separate mode from the normal operating mode used to revolve AC motor 29. It might, for example, be established before starting up normal operation. At start-up, at the low voltage $V_r$ shown in FIG. 5 (A), when a current of high frequency $F_r$ is supplied to AC motor 29, the current value $I_r$ will be detected.

Even if discrimination unit 48 does not consist of the analog device described above, the discrimination unit can store a table which represents the winding specifications of AC motor 29, the digitized signal representing the current value $I_r$ which flows when a specified output voltage $V_r$ and output frequency $F_r$ are applied, and the upper and lower ranges of the specified current value $I_r$ for each type of rotor unit. Then when the current value $I_r$ is detected, the table can be used as a map search to pinpoint the type of rotor unit connected to the motor, and a signal can be output to convey this information.

In response to the signal representing the type of rotor unit, control circuit 80 applies a control signal to the base of transistors 76a and 77a in chopper circuit 76 and inverter bridge circuit 77. In this way the output voltage V and output frequency F from chopper circuit 76 and inverter bridge circuit 77 can be adjusted in an appropriate fashion for the type of rotor unit connected to AC motor 29.

If control circuit 80 determines from the signal that the type of rotor unit recognized is the appropriate one, AC motor 29 goes into normal operating mode. If the type of rotor unit recognized is not the one that is actually connected to the motor, an error signal E will drive alarm 82, and the motor will shut down.

In this way the type of turbo molecular pump which is connected to the motor can be determined accurately and automatically under a variety of conditions. This will prevent damage to the high-speed rotor unit resulting from operator error and so will significantly improve reliability and safety.

In the embodiment discussed above, inverter 71 used a PAM scheme; it should be clear that the same result could be achieved with an inverter using a PWM (pulse width modulation) scheme.

If the inverter uses PWM, the pulse width of the carrier frequency should be fixed. This will result in a fixed output voltage V and a fixed output frequency F from inverter bridge circuit 77.

Further, as mentioned earlier, if the output frequency F is kept high, the differences between the various current values I for the different types of turbo molecular pumps will be larger. Keeping the voltage V low and the frequency F high will result in more accurate discrimination of rotor unit types.

EFFECTS OF THE INVENTION

With this invention, as is described above, there are no circuits in either the pump unit A or the power supply unit B which limit their compatibility with various types of rotor units. The units can be changed easily for different types of rotor units, and power supply unit B can be used with any type of rotor unit.

There is no control panel in the pump unit, so the overall configuration is simplified. This increases productivity and makes it easier to provide aftermarket service. A single power supply device can operate a number of different pump units. This makes the rotor units and plants in which the pump unit is used simpler to design, smaller, and easier to maintain.

Various other effects are also achieved.

What is claimed is:

1. A drive control device for controlling a motor driven high-speed rotor unit, comprising:
   a high-speed rotor unit equipped with magnetic bearings comprising electromagnets at a rotor or a stator of a drive motor, and supported in mid-air by the magnetic force of said magnetic bearings for rotating at high speed to implement the specified load functions; and
   a power supply unit equipped with a magnetic bearing control means to control the electric power applied to said magnetic bearings according to a signal from the position sensors for said high-speed rotor unit, and a motor drive control means to control the motor drive power applied to the rotor and stator of the drive motor for said high-speed rotor unit,
   wherein said power supply unit further comprises a plurality of tables of control constants to control various types of said high-speed rotor units, and an appropriate table out of said plurality of tables is selected for each type of high-speed rotor unit according to a discriminating signal indicating the type of high-speed rotor unit before said high-speed rotor unit is driven.

2. A drive control device according to claim 1, wherein said discriminating signal is detected by a type of a connector connecting said high-speed rotor unit and said power supply unit.

3. A drive control device according to claim 1, wherein said discriminating signal is detected by a drive current of said drive motor while said high-speed rotor unit is at rest.

4. A drive control device according to claim 3, wherein said drive motor is an inverter drive motor which controls rotation speed while maintaining a voltage/frequency (V/f) value for said inverter drive motor constant, and minimizing said V/f value by setting said frequency high.

5. A drive control device according to claim 1, wherein said selected control constants from said plurality of tables selected according to said discriminating signal are loaded in at least one of said magnetic bearing control means and said motor drive control means, and thus said drive control device can be converted to a specific drive control device detected by said discriminating signal.

6. A drive control device according to claim 5, wherein said control constants are searched in said plurality of tables according to said discriminating signal before said magnetic bearing control means begins the control operation, and said searched control constants from said plurality of tables according to said discriminating signal are loaded in both said magnetic bearing control means and said motor drive control means.

7. A discriminating method to discriminate a type of high-speed rotor unit used in a drive control device for controlling a motor driven high-speed rotor unit equipped with magnetic bearings comprising electromagnets at a rotor or a stator of a drive motor which has various winding specifications depending on said high-speed rotor unit, wherein said rotor is supported in mid-air by the magnetic force of said magnetic bearings for rotating at high speed to implement the specified load functions, comprising a step of discriminating a specific type of said high-speed rotor unit by a drive current of said drive motor while said high-speed rotor unit is at rest.

8. A discriminating method according to claim 7, wherein said high speed rotor unit has an inverter drive motor which controls rotation speed, said method comprising the steps of:

maintaining a voltage/frequency (V/f) value for said inverter drive motor constant;

minimizing said V/f value by setting said frequency high; and detecting a drive current of said inverter drive motor.

* * * * *